United States Patent
Sayama et al.

(10) Patent No.: US 10,154,547 B2
(45) Date of Patent: Dec. 11, 2018

(54) CORE METAL FOR RESIN WELDING, COMPOSITE MEMBER AND METHOD OF MANUFACTURING THE SAME

(71) Applicant: NETUREN CO., LTD., Tokyo (JP)

(72) Inventors: Hideto Sayama, Tokyo (JP); Toshio Hachiya, Tokyo (JP); Kanji Endo, Tokyo (JP); Masatoshi Akiyama, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 251 days.

(21) Appl. No.: 14/757,393

(22) Filed: Dec. 23, 2015

(65) Prior Publication Data
US 2016/0119979 A1 Apr. 28, 2016

Related U.S. Application Data

(62) Division of application No. 13/428,229, filed on Mar. 23, 2012, now Pat. No. 9,266,282.

(51) Int. Cl.
*B32B 7/04* (2006.01)
*H05B 6/10* (2006.01)
(Continued)

(52) U.S. Cl.
CPC ............. *H05B 6/101* (2013.01); *B29C 65/02* (2013.01); *B29C 65/46* (2013.01);
(Continued)

(58) Field of Classification Search
CPC ................ B29C 65/46; B29C 66/1122; B29C 66/30321; B29C 66/52272; B29C 66/54;
(Continued)

(56) References Cited

U.S. PATENT DOCUMENTS

| 5,722,295 A * | 3/1998 | Sakai | F16H 55/06 264/101 |
| 6,622,814 B2 | 9/2003 | Kurokawa et al. | |
| 2006/0272438 A1 | 12/2006 | Kurokawa | |

FOREIGN PATENT DOCUMENTS

| JP | 07-108607 A | 4/1995 | |
| JP | 07-237266 A | 9/1995 | |
| JP | 07237266 A * | 9/1995 | ............. B29C 65/46 |
| JP | 2001-141033 A | 5/2001 | |

(Continued)

OTHER PUBLICATIONS

Machine Translation of JP-2007237459-A (Year: 2007).*

(Continued)

*Primary Examiner* — Daniel McNally
(74) *Attorney, Agent, or Firm* — Westerman, Hattori, Daniels & Adrian, LLP

(57) ABSTRACT

The core metal for resin welding improves bonding strength between an outer peripheral resin member and the core metal. The outer peripheral resin member 30 is welded to the peripheral surface 21 of the core metal 20 by fitting the core metal into a fitting hole 31 of the outer peripheral resin member 30, preparing the outer peripheral resin member 30 providing the fitting hole 31 with a smooth internal wall surface; preparing the core metal 20 wherein streaky protrusions 26 and smooth portions 25 are provided; allowing the top parts of the protrusions 26 to contact, and the smooth portions of the core metal 20 to face the smooth internal wall surface; and induction heating to weld the outer peripheral resin member 30 to the protrusions 26 and the smooth portions 25.

11 Claims, 5 Drawing Sheets

(51) Int. Cl.
| | |
|---|---|
| *B32B 3/30* | (2006.01) |
| *B32B 15/08* | (2006.01) |
| *B29C 65/46* | (2006.01) |
| *B29C 65/00* | (2006.01) |
| *B29C 65/02* | (2006.01) |
| *B32B 1/08* | (2006.01) |
| *B32B 15/01* | (2006.01) |
| *B29L 31/32* | (2006.01) |

(52) U.S. Cl.
CPC .... *B29C 66/1122* (2013.01); *B29C 66/30321* (2013.01); *B29C 66/52272* (2013.01); *B29C 66/54* (2013.01); *B29C 66/742* (2013.01); *B29C 66/8322* (2013.01); *B29C 66/91411* (2013.01); *B29C 66/91431* (2013.01); *B29C 66/91651* (2013.01); *B29C 66/91933* (2013.01); *B32B 1/08* (2013.01); *B32B 3/30* (2013.01); *B32B 15/01* (2013.01); *B32B 15/08* (2013.01); *B29C 66/71* (2013.01); *B29C 66/7392* (2013.01); *B29C 66/73113* (2013.01); *B29C 66/74283* (2013.01); *B29K 2995/0077* (2013.01); *B29L 2031/32* (2013.01); *B32B 2311/00* (2013.01); *Y10T 156/1052* (2015.01); *Y10T 428/12389* (2015.01); *Y10T 428/24339* (2015.01)

(58) Field of Classification Search
CPC .............. B29C 66/742; B29C 66/8322; B29C 66/91411; B29C 66/91431; B29C 66/91651; B29C 66/91933
See application file for complete search history.

(56) References Cited

FOREIGN PATENT DOCUMENTS

| | | | |
|---|---|---|---|
| JP | 2003-028278 A | | 1/2003 |
| JP | 2003-118006 A | | 4/2003 |
| JP | 2004255803 A | * | 9/2004 |
| JP | 2006-194296 A | | 7/2006 |
| JP | 2007-196751 A | | 8/2007 |
| JP | 2007-237459 A | | 9/2007 |
| JP | 2007237459 A | * | 9/2007 ............ B29C 65/46 |
| JP | 2007-309512 A | | 11/2007 |
| WO | 01/81071 A1 | | 11/2001 |
| WO | 2005/104692 A2 | | 11/2005 |
| WO | 2012/029525 A1 | | 3/2012 |

OTHER PUBLICATIONS

Machine Translation of JP-07237266-A (Year: 1995).*
Machine Translation of JP-2004255803-A (Year: 2004).*
Extended European Search Report dated Aug. 16, 2012, issued in corresponding European patent application No. 12160945.7 (9 Pages).

\* cited by examiner (a)

(b)

CORE METAL FOR RESIN WELDING, COMPOSITE MEMBER AND METHOD OF MANUFACTURING THE SAME

CROSS-REFERENCE TO RELATED APPLICATIONS

This application is a divisional of U.S. application Ser. No. 13/428,229, filed on Mar. 23, 2013, the entire contents of which is incorporated herein by reference.

TECHNICAL FIELD

The present invention relates to a core metal for resin welding to be fitted into a fitting hole of an outer peripheral resin member to allow the outer peripheral resin member to be welded to the peripheral surface of the core metal by subjecting the whole to induction heating, a composite member formed by welding the outer peripheral resin member to the peripheral surface of the core metal for resin welding (may hereinafter be referred to as just core metal), and a method of manufacturing the composite member.

BACKGROUND ART

Composite members created by welding an outer peripheral resin member to the peripheral surface of a core metal have conventionally been used for various parts and devices. When using such a composite member to a worm wheel of a power steering device, it is required to bond the core metal and the outer peripheral resin member securely to ensure secure steering and good durability of the device.

Some techniques for welding an outer peripheral resin member to the periphery of a core metal by fitting the core metal into a fitting hole of the outer peripheral resin member and then subjecting them to induction heating have been proposed. For example, the following Patent Literature 1 discloses a method of fastening a metal boss to a resin formation. With this method, forming concave-convex shape on the surface contacting the resin, namely the peripheral surface of the metal boss, is conducted first. On the resin formation, a through hole having a diameter slightly smaller than the outer diameter of the metal boss is formed. A bonding material is applied to the roughened surface of the metal boss, the resin formation is heated to expand the diameter of the through hole, and the metal boss is pressure-fed into the through hole. Then, by conducting high-frequency induction heating, the part of the resin formation contacting the metal boss is heated to the melting temperature or higher to weld the resin formation to the metal boss. According to the method of cited literature 1, molded articles such as flat gears and wheels made of a resin and metal can be manufactured efficiently.

Patent Literature 2 discloses a method of manufacturing a worm wheel. According to this method, outer peripheral concaves and convexes lined up in the circumferential direction are formed first on the outer periphery of a metal core metal, and on the inner periphery of a resin ring gear, inner peripheral concaves and convexes lined up in the circumferential direction are formed in a shape matching the outer peripheral concaves and convexes of the core metal. The outer peripheral concave-convex portion and the inner peripheral concave-convex portion are fitted with an adhesive agent sandwiched between the ring gear and the core metal, and high-frequency welding is then performed for bonding. Cited literature 2 asserts that the degree of freedom in design can be improved while the fixing strength between the metal core metal and the resin ring gear is maintained.

With the conventional technique of performing induction heating with a core metal fitted into a fitting hole on the outer peripheral resin member, as disclosed both in Patent Literatures 1 and 2, concaves and convexes are formed on the peripheral surface of the core metal to improve the bonding strength by welding between the outer peripheral resin member and the core metal. For example, in Patent Literature 1, knurling of 1 to 3 mm is conducted to improve bonding strength. The cited literature 2 forms male serrations on the outer periphery of the metal core metal to improve bonding strength.

CITATION LIST

Patent Literature

Patent Literature 1: JP2003-118006A
Patent Literature 2: JP2001-141033A

SUMMARY OF INVENTION

Technical Problem

With conventional methods, by forming the concave-convex shape of the core metal larger, bonding strength of the outer peripheral resin member to the core metal is improved.

However, when forming the concave-convex shape large, if the concave-convex shape was formed by knurling, larger working force was required at the time of processing, or machining was required. Furthermore, when forming a large concave-convex shape in a direction of height or depth on the core metal, matching was allowed by forming a concave-convex shape corresponding to the concave-convex shape of the core metal on the inner peripheral surface of the outer peripheral resin member as described in cited document 2. Consequently, time and efforts were required to improve the bonding strength of the outer peripheral resin member to the core metal.

The first objective of the present invention is to provide a core metal for resin welding whose bonding strength with the outer peripheral resin member can be improved easily, and the second objective is to provide a composite member having improved bonding strength using the core metal. The third objective is to provide a method of manufacturing a composite member capable of easily improving the bonding strength between the core metal and the outer peripheral resin member.

Solution to Problem

Even if the core metal is fitted into the fitting hole of the outer peripheral resin member and induction heating is conducted, minute unwelded part is generated between the surface of concave-convex shape of the core metal and the outer peripheral resin member unless the outer peripheral resin member sets thoroughly in the the concave-convex shape of the core metal. If unwelded part is generated, the bonding strength between the core metal and the outer peripheral resin member decreases, and bonding strength of the outer peripheral resin member to the core metal in the circumferential direction and the bonding strength in the direction of central axis also decrease.

If the concave-convex shape on the surface of the core metal is made large in the direction of height or depth to expect to increase the bonding strength between the core metal and the outer peripheral resin member, spacing of contact between the concave surface of concave-convex shape of the core metal and the outer peripheral resin member increases or the contact area between the convex surface of concave-convex shape of the core metal and the outer peripheral resin member decreases in the fitted state before welding is performed. If induction heating is performed in this state, the inner periphery of the outer peripheral resin member cannot be melted uniformly by the heat from the core metal, and consequently unwelded part may increase or local overheating may occur, thus generating deformation with non-uniform resin arrangement.

Even if the concave-convex shape is provided on the inner periphery of the outer peripheral resin member, unwelded part or overheated part may be generated in places where the concave-convex shape of the core metal and the concave-convex shape of the outer peripheral resin member do not match.

As a result, it was newly found that if the outer peripheral resin member is welded to the core metal by induction heating while generation of overheated part is prevented, the resin cannot be set into the concave-convex portion of the core metal thoroughly, unwelded portion is generated on the surface of the concave-convex portion, and thus the bonding strength cannot be improved fully.

Based on such knowledge, a core metal to achieve the first objective is fitted into a fitting hole of an outer peripheral resin member and subjected to induction heating to allow the outer peripheral resin member to be welded to the peripheral surface comprising a plurality of streaky protrusions formed in a direction crossing the circumferential direction and arranged in the circumferential direction, and smooth portions placed on both ends of the streaky protrusions, wherein, a gap is formed between the streaky protrusions lying next to each other when fitted into the fitting hole of the outer peripheral resin member, and distance from the central axis of the core metal to the smooth portions is smaller than the distance from the central axis to the top parts of the streaky protrusions over the entire circumference.

According to the core metal for resin welding of the present invention, the plurality of streaky protrusions allow the entire bonding surface of the outer peripheral resin member to be melted, thereby ensuring that the resin sets into every gap between the plurality of streaky protrusions and, over the entire area of the smooth portions of the core metal. Consequently, the bonding strength with the outer peripheral resin member can be improved easily.

It is especially preferable that the height of the plurality of streaky protrusions is 1 mm or lower, and that the gap between the streaky protrusions lying next to each other be 2 mm or smaller.

It is preferable that the plurality of streaky protrusions are provided protruding outward from the smooth portions at the height of 1 mm or lower. It is especially preferable that the width of the smooth portions of the core metal along the central axis falls within a range from 0.5 to 1 time as the maximum distance of the gap between the streaky protrusions lying next to each other.

A composite member of the present invention to achieve the second objective is provided with the core metal for resin welding described above and an outer peripheral resin member welded to the peripheral surface of the core metal.

According to this composite member, since the core metal having the structure described above is used, the bonding strength between the core metal and the resin material can be improved.

The third objective of the present invention is to provide a method of manufacturing a composite member by fitting a core metal into a fitting hole of an outer peripheral resin member and subjecting them to induction heating, thereby welding the outer peripheral resin member to the peripheral surface of the core metal, including: preparing the core metal wherein a plurality of streaky protrusions formed in a direction crossing the circumferential direction and arranged in the circumferential direction and smooth portions placed on both ends of the streaky protrusions are provided on the peripheral surface; preparing the outer peripheral resin member wherein the fitting hole is provided with a smooth internal wall surface; allowing the top parts of the plurality of protrusions to contact, and the smooth portions of the core metal to face oppositely, the smooth internal wall surface by fitting the fitting hole of the outer peripheral resin member to the peripheral surface of the core metal; and then performing induction heating to weld the outer peripheral resin member to the plurality of streaky protrusions and the smooth portions.

If the composite member is manufactured in this way, since the fitting hole of the outer peripheral resin member has the smooth internal wall surface that is made to contact the top parts of the plurality of streaky protrusions, the portions of the smooth internal wall surface contacting the streaky protrusions can be welded without fail. And, if the smooth internal wall surface facing oppositely to the plurality of streaky protrusions and to the portions between the plurality of streaky protrusions of the core metal for resin welding is melted thoroughly to allow it to set into every corner of the gaps between the streaky protrusions for welding, welding between the flat portions of the core metal and the smooth internal wall surface of the outer peripheral resin material is also ensured, and the smooth internal wall surface of the outer peripheral resin material can be bonded to the peripheral surface of the cored bar with sufficient strength. Furthermore, by providing a plurality of streaky protrusions and flat portions on the peripheral surface of the core metal and a smooth internal wall surface contacting the top parts of the plurality of streaky protrusions on the outer peripheral resin member, the bonding strength of the composite member can be improved easily. It is unnecessary to create concave-convex shape for fitting on the outer peripheral resin member.

With this method of manufacturing a composite member, it is preferable that the smooth portions of the core metal and the internal wall surface of the outer peripheral resin member are made to face oppositely and apart from each other by fitting the fitting hole of the outer peripheral resin member to the peripheral surface of the core metal.

It is especially preferable that the height of the plurality of streaky protrusions is 1 mm or lower, and that the gap between the streaky protrusions lying next to each other be 2 mm or smaller.

It is preferable that the plurality of streaky protrusions are provided protruding outward from the smooth portions at the height of 1 mm or lower. It is especially preferable that the width of the smooth portions of the core metal along the central axis falls within a range from 0.5 to 1 time as the maximum distance of the gap between the streaky protrusions lying next to each other.

With this method of manufacturing a composite member, by cutting off the end faces after the outer peripheral resin member is welded to the core metal, the portions where the smooth portions of the core metal and the outer peripheral resin member are welded incompletely is removed.

Advantageous Effect of Invention

According to the core metal for resin welding of the present invention, since the peripheral surface has a plurality of streaky protrusions formed in the direction crossing the circumferential direction and flat portions, a core metal capable of improving the bonding strength between the peripheral surface of the core metal and the outer peripheral resin member can be provided.

According to the composite member of the present invention, since the core metal having the structure described above is used, a composite member having improved bonding strength between the core metal and the resin member can be provided.

According to the method of manufacturing a composite member of the present invention, since the plurality of streaky protrusions formed in the direction crossing the circumferential direction and the flat portions are provided on the peripheral surface of the core metal, the fitting hole of the outer peripheral resin member is provided with a smooth internal wall surface, and they are fitted and made to undergo induction heating, a method of manufacturing a composite member having improved bonding strength between the core metal and the outer peripheral resin member can be provided.

DESCRIPTION OF EMBODIMENTS

The embodiment of the present invention will hereinafter be described by referring to FIGS. 1 to 5.

Figure 1:
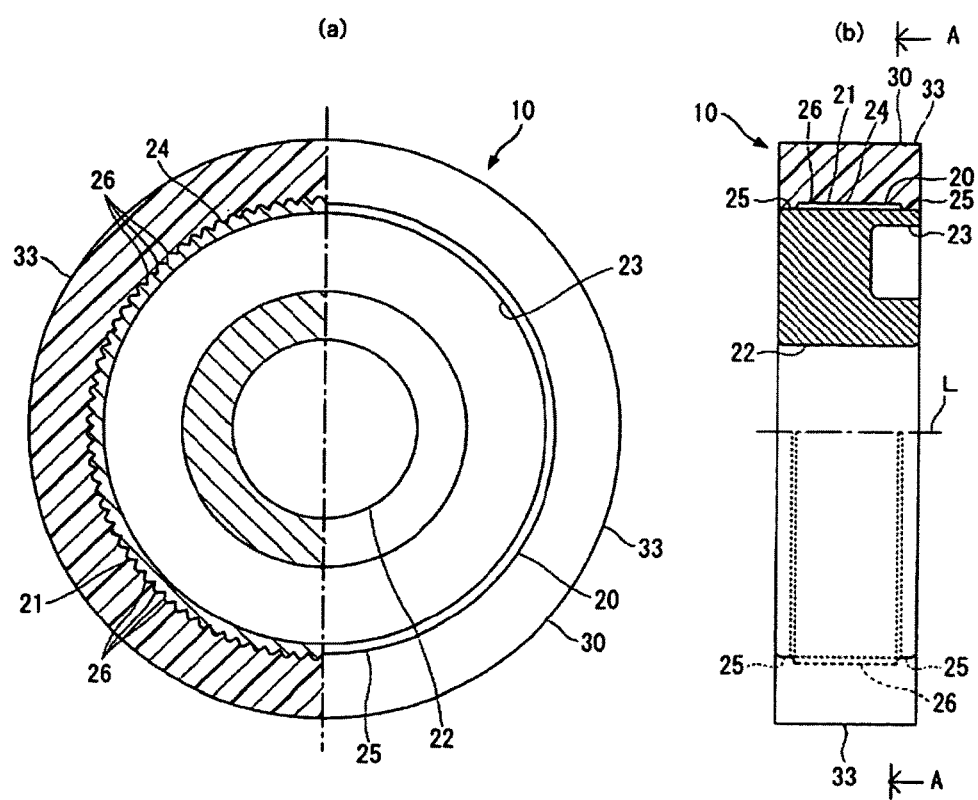
FIG. 1 (a) is a front view of a composite member according to the embodiment of the present invention with a part illustrated as a cross-sectional view, and (b) is a side view of the composite member with a part illustrated as a cross-sectional view.

As shown in FIG. 1 (a) and (b), a composite member 10 of this embodiment has a rough disk shape formed around a central axis L, and has a core metal for resin welding 20 and an outer peripheral resin member 30 welded onto the peripheral surface 21 of this core metal 20. This composite member is an example of a worm wheel blank for electric power steering. A worm wheel blank is an intermediary body for manufacturing a worm wheel of electric power steering equipment by forming gear grooves on the outer peripheral surface, or by other means.

Figure 2:
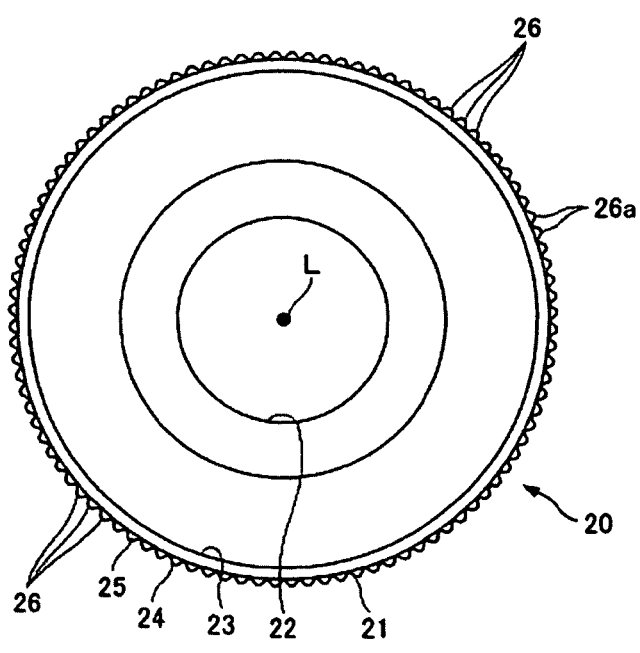
FIG. 2 (a) is a front view of a core metal for resin welding according to the embodiment of the present invention, and (b) is a side view of the core metal for resin welding with a part illustrated as a cross-sectional view.
Figure 2:
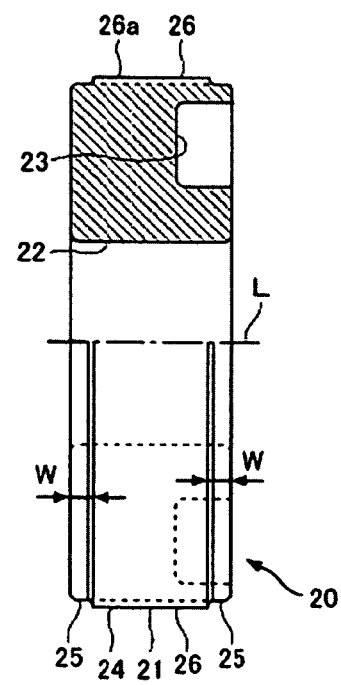

As shown in FIG. 2 (a) and (b), the core metal 20 of the composite member 10 has a rough disk shape having a given length in the direction of central axis L, and at the center, a through hole 22 having a given cross-sectional shape is provided along the central axis L. One of the end faces is formed flat, whereas on the other end face, a hollow 23 in a shape of an annular groove is formed. The peripheral surface 21 is formed in parallel to the central axis L, and has an annular concave-convex portion 24 provided over the entire length in the circumferential direction and smooth portions 25 having a circular cross-sectional shape formed at both ends of the concave-convex portion 24 in the direction along the central axis L.

The concave-convex portion 24 is made of many streaky protrusions 26 formed in a direction crossing the circumferential direction and arranged in the circumferential direction. It is preferable that the many streaky protrusions 26 are arranged uniformly at a certain pitch over the entire circumference.

It is preferable that each streaky protrusion 26 has a shape allowing the resin to melt easily in a state contacting the inner surface of the fitting hole 31 of the outer peripheral resin member 30 at the time of induction heating, which will be described later, and also ensuring the bonding strength between the peripheral surface of the core metal and the resin member after welding. To achieve those objectives, it is preferable that the many of the streaky protrusions 26 are made to be in the same shape, and more favorably, all the streaky protrusions 26 are made to be in the same shape.

Figure 3:
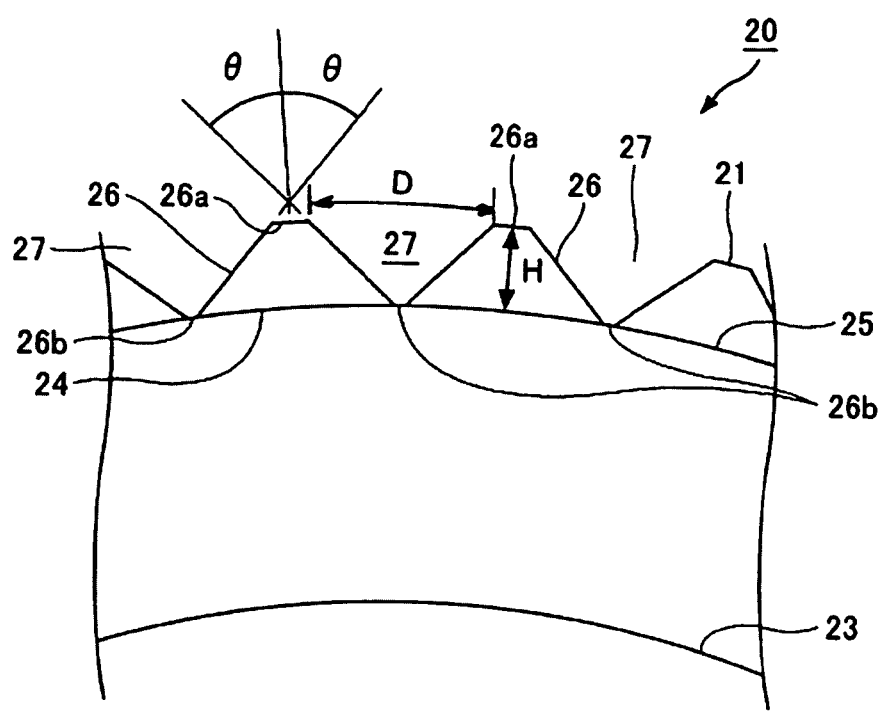
FIG. 3 is a partial magnified view of streaky protrusions of a core metal for resin welding according to the embodiment of the present invention.

In this embodiment, all the streaky protrusions 26 are formed in the same shape. As shown in FIG. 3, each streaky protrusion 26 has a cross-sectional shape in the circumferential direction of a mound having a narrowed top part 26a and a wider base 26b, namely the shape of a rough triangle. Both sides may be formed in any shape such as flat or curved. Such a shape allows melted resin to fill in the gap 27 between the streaky protrusions lying next to one another easily at the time of induction heating, which will be described later.

The top part 26a may be a curved or flat surface, or may be in a pointed shape. It is preferable that the base 26b between the streaky protrusions 26 lying next to each other is in a flat or curved shape. Such shapes of the base 26b allow molten resin to settle on the base 26b entirely when induction heating is performed.

Both sides of each streaky protrusion 26 may be symmetrical or asymmetrical with respect to the top part 26a. There is no restriction on the gradient of each side face, but it is favorable that the maximum angle θ to the normal of the peripheral surface 21 of the core metal 20 falls within the 30° to 60° range, more favorably, within the 40° to 50° range. If the maximum angle θ is too small, the gap 27 between the streaky protrusions 26 lying next to each other becomes deep, thus making it difficult for the molten resin to fill in the gap 27 at the time of induction heating, which will be described later. Meanwhile, if the maximum angle θ is too large, the gap 27 between the streaky protrusions 26 lying next to each other becomes shallow, thus making it difficult to obtain mechanical holding power between the streaky protrusions 26 and the outer peripheral resin member 30 in the circumferential direction.

Each streaky protrusion 26 formed in a direction crossing the circumferential direction may remain parallel to the central axis L, or may be slanted against the central axis L.

If each streaky protrusion 26 remains parallel to the central axis L, the core metal 20 can be created by forging. The shape of each streaky protrusion 26 is allowed to change in the longitudinal direction along the central axis L, but if a certain cross-sectional shape or a convex shape is maintained along the entire length, the core metal 20 may be manufactured easily by forging.

It is preferable that the height H of each streaky protrusion 26 is 1 mm or lower. This height H of the streaky protrusions 26 is the difference between the distance from the central axis L to the top part 26a of each streaky protrusion 26 and the distance from the central axis L to the base 26b between streaky protrusions 26 lying next to each other. If the height H of each streaky protrusion 26 is too high, the depth of the gap 27 between the streaky protrusions 26 lying next to each other becomes too deep, thus making it difficult for the molten resin to set in thoroughly. Meanwhile, it is preferable that the height H of each streaky protrusion 26 is 0.5 mm or higher, more favorably, 0.7 mm or higher. If the height H of each streaky protrusion 26 is too low, it becomes difficult to ensure mechanical holding power between the core metal 20 and the outer peripheral resin member in the circumferential direction and in the direction along the central axis after welding.

In this concave-convex portion 24, it is preferable that the gap between the streaky protrusions 26 lying next to each other, namely the maximum distance D of the gap 27, is 2 mm or less. The maximum distance D of the gap 27 between streaky protrusions 26 lying next to each other is the distance between the top parts 26a of the streaky protrusions 26 lying next to each other. For example, if the top part 26a of each streaky protrusion 26 is in a pointed shape, the distance between the top parts 26a of the streaky protrusions 26 approximated by a linear line may be adopted, and if a flat or curved surface is provided at the top part 26a of each streaky protrusion 26 and an edge is provided on both sides, the distance between neighboring edges of the protrusions lying next to each other approximated by a linear line may be adopted. If the top part 26a of each streaky protrusion 26 is in a curved shape and edges are not provided, the distance between the parts actually contacting the outer peripheral resin member 30, which will be described later, approximated by a linear line may be adopted.

If the gap 27 between the streaky protrusions 26 lying next each other is excessively large, the heat to be supplied from each streaky protrusion 26 to the outer peripheral resin member 30 cannot be transmitted fully at the time of induction heating, which will be described later. Consequently, the resin of the outer peripheral resin member 30 existing in the gap 27 between the streaky protrusions 26 lying next to each other cannot be melted thoroughly, allowing unwelded part to be generated easily. Meanwhile, if the gap 27 between the streaky protrusions 26 lying next to each other is excessively small, the depth of each streaky protrusion 26 cannot be made deep, and consequently the amount of protrusion becomes small, thus making it difficult to ensure sufficient bonding strength between the core metal and the outer peripheral resin member 30 after welding. It is preferable that the maximum distance D of the gap 27 between the streaky protrusions 26 lying next to each other is 1 mm or longer.

Smooth portions 25 of the core metal 20 are provided at positions where the concave-convex portion 24 is placed nearby in the direction along the central axis L, namely at positions adjacent to both sides of many streaky protrusions 26. This smooth portion 25 has a surface having no concaves or convexes parallel to the central axis L, favorably a curved surface having a circular cross-sectional shape. The distance from the central axis L to the smooth portion 25 is shorter than the distance from the central axis L to the top part 26a of the streaky protrusions 26 of the concave-convex portion 24. By providing the smooth portions 25 at this distance, the top parts of the many streaky protrusions 26 are made to protrude outward from the smooth portion 25 by the height of 1 mm or lower. This height is preferably 0.5 mm or higher, or more preferably, 0.7 mm or higher. Consequently, if heating is performed with the smooth internal wall surface 32, which will be described later, of the outer peripheral resin member 30 facing oppositely, the outer peripheral resin member 30 can be welded to the smooth portions 25 by the heat supplied from the many streaky protrusions 26.

The distance from the central axis L to the smooth portions 25 described above should be the same as the distance from the base 26b of the streaky protrusions 26 lying next to each other to the central axis L or shorter, but it is especially preferable that the distances is the same. As a result of welding of the outer peripheral resin member 30 to the smooth portions 25 after welding, mechanical holding power between the both ends of each streaky protrusion 26 and the outer peripheral resin member 30 along the direction of the central axis L can be obtained, and the bonding strength can thus be improved.

It is preferable that the width W of the smooth portions 25 in the direction along the central axis L is 0.5 times the maximum distance D of the gap 27 between the streaky protrusions 26 lying next to each other or larger. By allowing the smooth portions 25 to have such a width, the outer peripheral resin member 30 can be welded also to the smooth portions 25 over a sufficient area on both sides of the many streaky protrusions 26 when the portions lying adjacent to the edges of each streaky protrusion 26 are softened or melted due to induction heating to be described later, which makes it possible to obtain mechanical holding power between the core metal for resin welding 20 and the outer peripheral resin member 30 in the direction along the central axis L.

The width W of this smooth portion 25 may be the same as or smaller than the maximum distance D of the gap 27. If the width W of the smooth portion 25 is excessively large, incomplete welded part may be formed between the smooth portions 25 and the outer peripheral resin member 30.

The hollow 23 and the through hole 22 of the core metal 20 are formed as required, with their shape and size determined arbitrarily. In this embodiment, the hollow 23 is formed in a shape of a groove open to one end face of the core metal 20, and its depth extends down to the inside of the base 26b of the concave-convex portion 24. Consequently, the distance between the hollow 23 and the base 26b of the concave-convex portion 24 remains thin. If the thickness of this portion is thin, the heat capacity can be decreased, and the temperature can be increased easily at the time of heating.

The hollow 23 may be a groove provided respectively on both end faces of the core metal 20, a hole having the depth reaching the position inside the concave-convex portion 24 provided locally on one or both of the end faces, or a hole provided locally in order that it penetrates the both end faces of the core metal 20.

Such a core metal 20 ensures desired performance such as strength required in applications of a composite member obtained, application as a worm wheel in this embodiment, and can be made of various metals that can undergo induction heating. This core metal 20 is provided with a through hole 22, hollow 23, etc. by forging, and formed in an all-in-one shape including a concave-convex portion 24 and smooth portions 25.

Since the through hole 22 and the hollow 23 can be provided by forging without removing the material, waste of materials can be eliminated. In addition, unlike knurling, forging allows the shape, height H, maximum distance D of the gap 27, position, and size of the plurality of streaky protrusions 26 to be set freely, and by adjusting them, optimum bonding strength of the outer peripheral resin member 30 can be ensured. Furthermore, if the plurality of streaky protrusions 26 are formed by forging, there is no need to pressurize the peripheral surface from outside, unlike knurling, and so streaky protrusions 26 can be formed easily on the peripheral surface 21 even if the thickness between the hollow 23 and the base 26b of the concave-convex portion 24 is as thin as the case of this embodiment, 5 mm or thinner for example.

The outer peripheral resin member 30 is a member made of a resin welded to the peripheral surface 21 of the core metal 20. This outer peripheral resin member 30 is a thermoplastic resin that can be melted or softened in a state contacting the core metal due to heat generated when the core metal 20 is heated, and appropriate materials can be selected as required according to the applications of the composite member. It is preferable that the material has thermal conductivity of a degree not allowing the surface side to be melted when the side of the fitting hole 31 is heated to the melting temperature or higher.

In this embodiment, to ensure the strength required for a worm wheel and facilitate ensuring heat resistance, polyamides such as 6,6-nylon, 6-nylon, and 4,6-nylon are used. Of these, 6-nylon is excellent because strength can be ensured easily and for other reasons, and in particular MC nylon (Quadrant Polypenco Japan Ltd., registered trademark), which has excellent mechanical strength, thermal properties, and chemical properties, is ideal. To ensure sliding property, (polyetheretherketone) (PEEK), polyphenylene sulfide (PPS), polyacetal (POM), etc. may be used.

Figure 4:
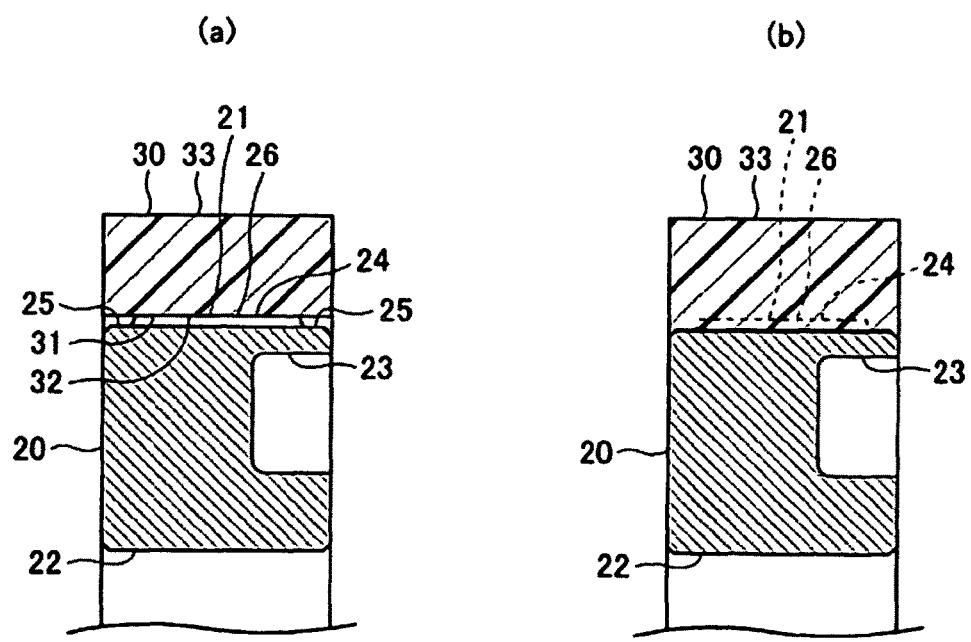
FIG. 4 (a) is a cross-sectional view illustrating the state of the streaky protrusions of a core metal for resin welding and an outer peripheral resin member before welding according to the embodiment of the present invention, and (b) is a cross-sectional view illustrating the state of the streaky protrusions of the core metal for resin welding and the outer peripheral resin member after welding.

The outer peripheral resin member 30 in this embodiment is in a shape of a ring. The inner peripheral surface of the outer peripheral resin member 30 is welded in intimate contact to the peripheral surface 21 of the core metal 20. Namely, as shown in FIG. 4 (b), the outer peripheral resin member 30 buries completely the many streaky protrusions 26 provided on the peripheral surface 21 of the core metal 20 and fills every corner of the gap 27 between the streaky protrusions 26, thereby securely fastening each streaky protrusion 26 and also securely welding the smooth portions 25.

In a state where the outer peripheral resin member 30 is welded to the core metal 20, since the many streaky protrusions 26 are buried completely, the boundary between the core metal 20 and the outer peripheral resin member 30 viewed from the side of both end faces of the composite member 10 exhibits a circular shape formed by the edge of the smooth portions 25 as shown in FIG. 1. Note that the dimensions of the outer peripheral shape and the thickness of the outer peripheral resin member 30 include the allowance for processing of gear teeth, etc. of a worm wheel.

A method of manufacturing the composite member 10 will hereafter be described.

Figure 5:
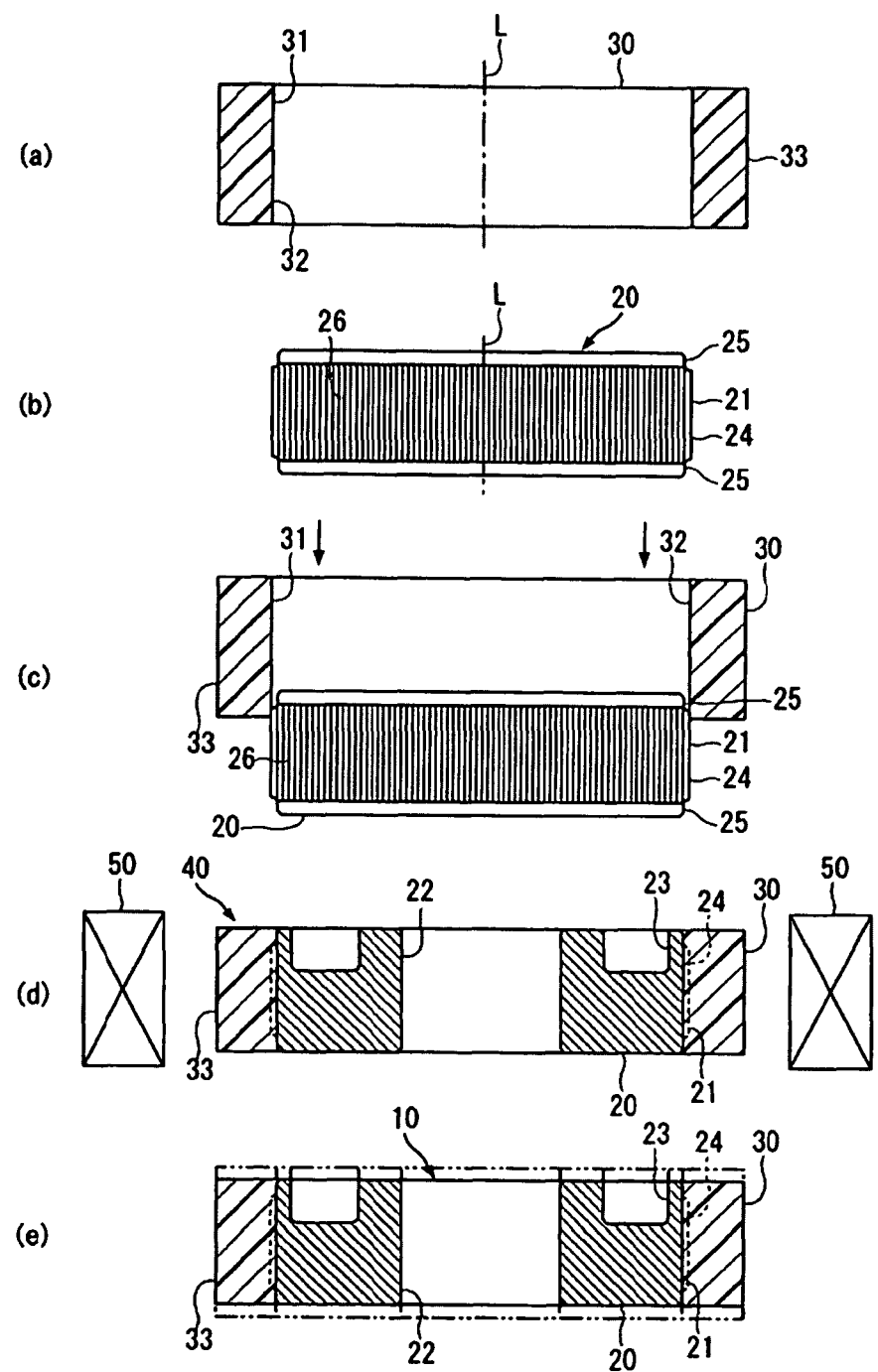
FIG. 5 (a) to (e) illustrate the manufacturing process of a composite member according to the embodiment of the present invention.

The method of manufacturing the composite member 10 includes a preparation process of providing an outer peripheral resin member 30 and a core metal 20, a fitting process of fitting the fitting hole 31 of the outer peripheral resin member 30 to the peripheral surface 21 of the core metal 20 to manufacture a composite member 40, a welding process of welding the outer peripheral resin member 30 fitted to the peripheral surface of the core metal 20 by subjecting the core metal 20 to induction heating, and a pretreatment process of achieving desired accuracy as the composite member In the preparation process, as shown in FIG. 5 (a) and (b), the core metal 20 and the outer peripheral resin member 30 are formed separately.

As shown in FIG. 5 (b), a concave-convex portion 24, wherein a plurality of streaky protrusions 26 are formed adjacent to one another in the circumferential direction, is formed on the peripheral surface 21 of the core metal 20, and smooth portions 25 are formed on the both sides of the plurality of streaky protrusions 26, by forging. The width W along the central axis L of the smooth portions 25 is made to be larger than the 0.5 times the maximum distance D of the gap 27 between the streaky protrusions 26 lying next to each other.

After forging, machining, etc. can also be performed as required. By machining, the both end faces and the central axis L may be adjusted to ensure given perpendicularity, or each portion is formed with given accuracy.

As shown in FIG. 5 (a), the outer peripheral resin member 30 is a thermoplastic resin formed in a shape of a ring. In this embodiment, the outer peripheral resin member 30 has an outer peripheral surface 33 having a circular cross-sectional shape in parallel with the central axis L, a fitting hole 31 having an internal wall surface matching the peripheral surface 21 of the core metal 20, and flat end faces. The thickness between the both end faces is equivalent to the length of the concave-convex portion 24 provided on the peripheral surface 21 of the core metal 20 plus the smooth portions 25 on its both ends in the direction along the central axis L.

The fitting hole 31 is provided with a smooth internal wall surface 32 having a circular cross-sectional shape formed in parallel to the central axis L with no concave-convex shape provided. This fitting hole 31 may be a through hole or non-through hole, provided that the length in the direction along the central axis L is longer at least than the length of the concave-convex portion in the direction of the central axis. In this embodiment, the hole is formed as a through hole.

The fitting hole 31 is in a shape ensuring the contact of as many top parts of the streaky protrusions as possible, more favorably the contact of all the top parts of the streaky protrusions. It is preferable that the internal diameter of the smooth internal wall surface 32 of the fitting hole 31 is in a dimension ensuring fitting into the concave-convex portion 24 of the core metal 20. Specifically, the internal diameter of the smooth internal wall surface 32 is set slightly smaller than the maximum diameter constituted by the top parts 26a of the concave-convex portion 24, by 0.4 to 3% for example. If the internal diameter of the smooth internal wall surface 32 is much larger than the maximum diameter of the concave-convex portion 24, the smooth internal wall surface 32 may not be heated fully with the heat of the many streaky protrusions 26 when induction heating to be described later is performed, or the molten resin may not fill the gap 27 between streaky protrusions 26 lying next to each other thoroughly. Meanwhile, if the internal diameter of the smooth internal wall surface 32 is much smaller than the maximum diameter of the concave-convex portion 24, the outer peripheral resin member 30 itself is deformed.

Then in the fitting process, as shown in FIG. 5 (c), by fitting the fitting hole 31 of the external peripheral resin material 30 to the peripheral surface 21 of the core metal 20, the top parts of the plurality of streaky protrusions 26 are made to contact, and the smooth portions 25 to face oppositely, the smooth internal wall surface 32 as shown in FIG. 4 (*a*). By fitting the core metal 20 into the fitting hole 31 of the external peripheral resin material 30, a gap is formed between the streaky protrusions 26 lying next to each other.

To fit the core metal 20, the external peripheral resin material 30 may be expanded by heating to allow it to fit into the peripheral surface 21 of the core metal 20. For example, by heating the external peripheral resin material 30 in a heating furnace, etc., thereby expanding the diameter of the fitting hole 31 in order that it becomes the diameter matching the external diameter of the core metal 20, it becomes possible to insert the core metal 20 into the fitting hole 31 easily.

The heating temperature can be set based on the internal diameter of the fitting hole 31 against the external diameter of the core metal 20, and the type, softening point, expansion coefficient, etc. of the thermoplastic resin. For example, in the case of polyamides, the temperature is preferably set to 130 to 150° C. If the heating temperature is excessively high, the accuracy of form of the external peripheral resin material 30 may degrade. Meanwhile, if the heating temperature is excessively low, insertion of the external peripheral resin material 30 may require lots of labor.

The peripheral surface 21 of the core metal 20 can be fit into the fitting hole 31 of the external peripheral resin material 30 by applying pressure in the direction of the axis using a press, etc. while checking the parallelism and performing centering using a jig, etc. In this way, a composite member 40 combining the core metal 20 with the external peripheral resin material 30 is manufactured.

To improve the bonding strength between the core metal 20 and the external peripheral resin material 30, a layer of bonding strength enhancing agent such as various adhesive materials may be provided on one, or both, of the peripheral surface 21 of the core metal 20 and the external peripheral resin material 30 prior to this fitting process.

In the next welding process, as shown in FIG. 5 (*d*), the outer peripheral resin member 30 is welded to the concave-convex portion 24 and the smooth portions 25 of the core metal 20 by induction heating. This welding process is performed using a device capable of increasing the temperature of the core metal 20, and in this embodiment, a high-frequency induction heating device is used. This device is equipped with a heating coil 50 for generating an alternating field, and by controlling the supply of power to the heating coil 50, the temperature of the peripheral surface of the core metal 20 can be adjusted to a desired level. In addition, the composite member 40 and the heating coil 50 can be rotated relative to each other around the central axis L at the time of heating.

At the time of heating, by feeding high-frequency current to the heating coil 50, the core metal 20 is subjected to inducting heating, and the surface temperature of the core metal 20 is maintained within the temperature range the same as or higher than the melting temperature of the resin constituting the outer peripheral resin member 30. For example, if a resin whose melting temperature falls within the 200° C. to 240° C. range is used, the temperature is maintained at a level 20° C. to 60° C. higher than the melting temperature.

Hence, the regions of the external peripheral resin material 30 contacting the streaky protrusions 26 of the peripheral surface 21 and its neighboring region are heated by the heat of the core metal 20, and softening or melting results. The resin existing between the streaky protrusions 26 lying next to each other melts and sets into the gap 27 between the streaky protrusions 26, and the molten resin securely adheres to the concave-convex portion 24. The resin that is softened or melted at positions adjacent to the many streaky protrusions 26, of the external peripheral resin material 30, adheres to the area surrounding the smooth portions 25 of the core metal 20.

In this melting process, it is also possible to support a plurality of composite members 40 with an axial jig to allow them to undergo induction heating in batch. As axial jigs, those that can pass through the through hole 22 of each core metal 20 and fastened, and can be moved relative to the heating coil 50 in that state, can be used.

By discharging heat in the atmosphere, or by cooling using a coolant, after the melting process, the molten resin is hardened in a state closely adhered to the peripheral surface of the core metal 20.

In this embodiment, pretreatment process is then conducted. In the pretreatment process, the end faces of the external peripheral resin material 30 and those of the core metal 20 are subjected to machining to form them in a flat shape, for example. Here, by cutting the end faces as shown in FIG. 5 (*e*), the width W of the smooth portions 25 along the central axis L is made narrower. The amount of cutting of the end faces can be adjusted as required, and is made to be the same as or smaller than the maximum distance D of the gap 27 between the streaky protrusions 26 lying next to each other, for example. As a result, the part where the smooth portions 25 of the core metal 20 and the external peripheral resin material 30 are welded incompletely can be removed, and the smooth portions 25 and the external peripheral resin material 30 can be welded to each other completely over the entire circumference up to both ends. By performing machining, the width W of the smooth portions 25 is made to fall within the range from 0.5 to 1 time as the maximum distance D of the gap 27. If the width W of the smooth portion 25 is made to be excessively small, the holding force between the core metal 20 and the external peripheral resin material 30 in the direction along the central axis L may degrade.

In this pretreatment process, it is preferable that the accuracy of each part, such as the accuracy of the through hole 22, the parallelism of the external peripheral surface of the external peripheral resin material 30 with the central axis L, and the degree of orthogonal orientation of both end faces, is adjusted to fall within a given range.

Manufacture of the composite member 10 shown in FIG. 1 has thus been completed.

If a key groove is formed in the through hole 22 and a desired teeth, etc. are formed on the outer periphery of the external peripheral resin material 30 accurately on the composite member 10 thus obtained, a worm wheel, the final product, can be manufactured.

If the composite member 10 is manufactured by following the procedure described above, the external peripheral resin material 30 contacting each of the heated streaky protrusion 26 melts, and sets into every corner of the gap 27 between the streaky protrusions 26. As a result, generation of unwelded part can be prevented, and the external peripheral resin material 30 can be welded securely to the peripheral surface 21 of the core metal 20.

Furthermore, if the fitting hole 31 of the external peripheral resin material 30 is fitted to the peripheral surface 21 of this core metal 20 and they are then subjected to induction heating, the external peripheral resin material 30 at regions adjacent to the concave-convex portion 24 and the external peripheral resin material 30 at positions on both ends adjacent to the concave-convex portion 24 are welded due to each streaky protrusion 26 heated. Consequently, the molten resin sets into the gap 27 between the streaky protrusions 26, each streaky protrusion 26 and the external peripheral resin material 30 are welded, and the molten resin reaches the smooth portions 25 at positions adjacent to the both ends of each streaky protrusion 26, thereby welding the smooth portions 25 and the external peripheral resin material 30. As a result, the entire concave-convex portion 24 is embedded in the external peripheral resin material 30 and fastened securely.

After the external peripheral resin material 30 is welded, the concave-convex portion 24 is not visually recognized from either of the end surfaces of the core metal 20 and thus excellent appearance can be obtained. In addition, as a result of welding of the plurality of streaky protrusions 26 to the external peripheral resin material 30, the bonding strength by welding improves, mechanical holding force between the side face of the plurality of streaky protrusions 26 and the resin having set into the gap between the streaky protrusions 26 in the circumferential direction can be obtained, and furthermore, mechanical holding force between the both ends of the plurality of streaky protrusions 26 and the resin on the smooth portions 25 in the direction along the central axis L can be obtained. Consequently, the external peripheral resin material 30 can be welded to the core metal 20 with sufficient strength.

Furthermore, with this core metal 20, the width W of the smooth portion 25 is 0.5 times the maximum distance D of the gap 27 between the streaky protrusions 26 lying next to each other or larger. If the outer peripheral resin member 30 placed between the streaky protrusions 26 lying next to each other is heated to a degree to be melted sufficiently due to the heat of each streaky protrusion 26 at the time of welding, the neighborhood of the region of the outer peripheral resin member 30 contacting the streaky protrusions 26 also melts. Consequently, the resin of the outer peripheral resin member 30 having melted thoroughly in an area adjacent to the streaky protrusions 26 can be bonded to the smooth portions 25 of the core metal 20 without fail, which ensures sufficient bonding strength between the core metal 20 and the outer peripheral resin member 30.

In particular, the width W of the smooth portions 25 along the central axis L is made to be 0.5 times the maximum distance D of the gap 27 between the streaky protrusions 26 lying next to each other or larger, and after the outer peripheral resin member 30 is welded to the peripheral surface 21 of the core metal 20, the end faces are cut in order to narrow the width of the smooth portions 25 of the core metal 20.

Hence, at the time of welding, the both ends of the outer peripheral resin member 30 can be fused to the wide smooth portions 25 thoroughly, and thus securely welded to the smooth portions 25. In addition, since the end surfaces of the core metal 20 is cut after welding, a composite member 10 wherein the outer peripheral resin member 30 and the core metal 20 are securely welded up to the ends can be obtained.

It is therefore unnecessary in such a manufacturing process to form the concave-convex shape of the concave-convex portion 24 of the core metal 20 large, and also there is no need to provide concave-convex shape on the inner surface of the outer peripheral resin member 30. Hence, the bonding strength between the core metal 20 and the outer peripheral resin member 30 can be improved easily.

An example and comparative example will be described below.

EXAMPLE

A core metal for resin welding 20 as shown in FIG. 2 was created, a corresponding ring-shaped outer peripheral resin member 30 is fitted to the peripheral surface of the core metal 20, and by welding both by high-frequency induction heating, the composite member in the example was manufactured.

The core metal for resin welding 20 was made of carbon steel, its maximum diameter was 60 mm, its thickness was 16 mm, a 2-mm smooth portion 25 was provided on both ends of the peripheral surface 21, and a plurality of streaky protrusions 26 formed in the direction crossing the circumferential direction were arranged in the circumferential direction. The cross-sectional shape in the circumferential direction of each streaky protrusion 26 exhibited a rough triangular shape, and the angle at the top part 26a was made to be approximately 90° bilaterally symmetrical with respect to the normal from the central axis L. The height of each streaky protrusion 26 was 0.9 mm, and the maximum distance D of the gap between the streaky protrusions 26 lying next to each other was made to be 1.9 mm. Meanwhile, the outer peripheral resin member 30 was a compact made of MC nylon (QUADRANT POLYPENCO JAPAN LTD., registered trademark), and its external diameter was 85 mm, inner diameter of its fitting hole 31 was 60 mm, and thickness was 19 mm.

When performing induction heating, supply of power to the coil was controlled in order that the surface temperature of the core metal 20 remained around the melting temperature of the resin constituting the outer peripheral resin member 30.

The composite member 10 obtained was cut in the direction of the central axis, the cross section of the base 26b between the streaky protrusions 26 lying next to each other was observed, and the resin was found to have been welded over the entire length of the smooth portions 25 at both ends. In addition, in the example, a sufficient amount of resin of the outer peripheral resin member 30 was found to exist at the position of the base 26b, which confirms that the base 26b had been welded thoroughly.

Six composite members 10 were then manufactured in the same manner as described above, and loads were applied to the core metal 20 and the outer peripheral resin member 30 in the opposite directions with respect to the central axis L to measure their yield strength. It was found that the maximum value was 85.9 kN, the minimum value was 62.3 kN, and the average value was 75.2 kN.

Comparative Example 1

A composite member was manufactured in the same manner as the example except that the height of each streaky protrusion of the core metal was designed to be larger than 1 mm, and the maximum distance D of the gap 27 between the streaky protrusions 26 lying next to each other was designed to be larger than 2 mm.

The obtained composite member was cut in the direction of the central axis, the cross section at the position of the base 26b lying between the streaky protrusions 26 arranged next to each other was observed, and it was found that in comparative example 1, a number of minute unwelded portions existed between the streaky protrusions 26 lying next to each other, on the base 26b in particular.

In addition, six composite members 10 were manufactured, and loads were applied to the core metal 20 and the outer peripheral resin member 30 in the opposite directions with respect to the central axis L to measure their yield strength. As a result, it was found that the maximum value was 40.3 kN, the minimum value was 30.0 kN, and the average value was 34.2 kN. It was thus confirmed that the yield strength was lower than that of the example.

REFERENCE SIGN LIST

10 Composite member
20 Core metal for resin welding
21 Peripheral surface
22 Through hole
23 Hollow
24 Concave-convex portion
25 Smooth portion
26 Streaky protrusion
26a Top part
26b Base
27 Gap
30 Outer peripheral resin member
31 Fitting hole
32 Smooth internal wall surface
33 Outer peripheral surface
40 Composite member
50 Heating coil
L Central axis
H Height
W Width

What is claimed is:

1. A method of manufacturing a composite member by fitting a core metal into a fitting hole of an outer peripheral resin member and subjecting them to induction heating, thereby welding the outer peripheral resin member to the peripheral surface of the core metal, comprising:
    preparing the core metal wherein a plurality of streaky protrusions formed in a direction crossing the circumferential direction and arranged in the circumferential direction and smooth portions placed on both ends of the streaky protrusions are provided on the peripheral surface, said streaky protrusions each having a cross-sectional shape of a mound having a narrower top part and a wider base, with gaps between the mounds of streaky protrusions crossing the circumferential direction;
    preparing the outer peripheral resin member wherein the fitting hole is provided with a smooth internal wall surface;
    allowing the top parts of the plurality of protrusions to contact, and the smooth portions of the core metal to be separated from and face oppositely, the smooth internal wall surface by fitting the fitting hole of the outer peripheral resin member to the peripheral surface of the core metal; and then
    performing induction heating to weld the outer peripheral resin member to the plurality of streaky protrusions and to the smooth portions including heating the core metal to a temperature above a melting temperature of the outer peripheral resin member and melting resin of the outer peripheral resin member to extend into the gaps between the mounds of the streaky protrusions and to extend to the smooth portions.

2. The method of manufacturing a composite member as set forth in claim 1, wherein the smooth portions and the internal wall surface of the outer peripheral resin member are made to face oppositely apart from each other by fitting the fitting hole of the outer peripheral resin member to the peripheral surface of the core metal.

3. The method of manufacturing a composite member as set forth in claim 1, wherein the height of the plurality of streaky protrusions is 1 mm or lower, and the gap between the streaky protrusions lying next to each other is 2 mm or smaller.

4. The method of manufacturing a composite member as set forth in claim 1, wherein the plurality of streaky protrusions are provided protruding outward from the smooth portions at the height of 1 mm or lower.

5. The method of manufacturing a composite member as set forth in claim 1, wherein the width of the smooth portions of the core metal along the central axis falls within the range from 0.5 to 1 times as the maximum distance of the gap between the streaky protrusions lying next to each other.

6. The method of manufacturing a composite member as set forth in claim 1, wherein portions where the smooth portions of the core metal and the outer peripheral resin member are welded incompletely are removed by cutting end faces after the outer peripheral resin member is welded to the core metal.

7. The method of manufacturing a composite member as set forth in claim 1, wherein the core metal having the plurality of streaky protrusions and a hollow, which is formed from one end face of the core metal to the depth extending down to the inside of the base of the streaky protrusions, is manufactured by forging.

8. The method of manufacturing a composite member as set forth in claim 1, wherein the distance from the central axis of the core metal to the smooth portions is smaller than the distance from the central axis to the top parts of the streaky protrusions.

9. The method of manufacturing a composite member as set forth in claim 1, wherein the distance from the central axis of the core metal to the smooth portions is smaller than the distance from the central axis to the base between streaky protrusions lying next to each other.

10. The method of manufacturing a composite member as set forth in claim 1, wherein the outer peripheral resin member is made of a resin selected from any one of polyamides, polyetheretherketone (PEEK), polyphenylene sulfide (PPS) and polyacetal (POM).

11. The method of manufacturing a composite member as set forth in claim 10, wherein polyamides is selected from any one of 6,6-nylon, 6-nylon, and 4,6-nylon.

* * * * *